United States Patent
Jones

(10) Patent No.: US 6,431,833 B2
(45) Date of Patent: Aug. 13, 2002

(54) GAS TURBINE BUCKET WITH IMPINGEMENT COOLED PLATFORM

(75) Inventor: Raphael Durand Jones, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/768,220

(22) Filed: Jan. 24, 2001

Related U.S. Application Data

(63) Continuation of application No. 09/404,589, filed on Sep. 24, 1999.

(51) Int. Cl.$^7$ .............................................. F01D 5/08
(52) U.S. Cl. ................................ 416/97 R; 416/193 A; 416/248
(58) Field of Search ........................... 416/97 R, 96 A, 416/248, 239, 193 A, 1

(56) References Cited

U.S. PATENT DOCUMENTS

| | | | |
|---|---|---|---|
| 3,804,551 A | * 4/1974 | Moore | 416/97 R |
| 3,936,227 A | 2/1976 | Wojcik | |
| 3,967,353 A | 7/1976 | Pagnotta et al. | |
| 4,012,167 A | 3/1977 | Noble | |
| 4,017,213 A | * 4/1977 | Przirembel | 416/97 A |
| 4,244,676 A | 1/1981 | Grondahl et al. | |
| 4,350,473 A | * 9/1982 | Dakin | 416/1 |
| 4,531,889 A | 7/1985 | Grondahl | |
| 5,639,216 A | * 6/1997 | McLaurin et al. | 416/95 |
| 5,738,489 A | 4/1998 | Lee | |
| 5,800,124 A | * 9/1998 | Zelesky | 416/95 |
| 6,065,931 A | * 5/2000 | Suenaga et al. | 416/97 R |
| 6,158,962 A | 12/2000 | Lee et al. | |
| 6,176,678 B1 | 1/2001 | Brainch et al. | |

OTHER PUBLICATIONS

"39$^{th}$ GE Turbine State–of–the–Art Technology Seminar", Tab 1, ""F" Technololgy—the First Half–Million Operating Hours", H.E. Miller, Aug. 1996.

"39$^{th}$ GE Turbine State–of–the–Art Technology Seminar", Tab 2, "GE Heavy–Duty Gas Turbine Performance Characteristics", F. J. Brooks, Aug. 1996.

"39$^{th}$ GE Turbine State–of–the–Art Technology Seminar", Tab 3, "9EC 50Hz 170–MW Class Gas Turbine", A. S. Arrao, Aug. 1996.

"39$^{th}$ GE Turbine State–of–the–Art Technology Seminar", Tab 4, "MWS6001FA—An Advanced–Technology 70–MW Class 50/60 Hz Gas Turbine", Ramachandran et al., Aug. 1996.

"39$^{th}$ GE Turbine State–of–the–Art Technology Seminar", Tab 5, "Turbomachinery Technology Advances at Nuovo Pignone", Benvenuti et al., Aug. 1996.

"39$^{th}$ GE Turbine State–of–the–Art Technology Seminar", Tab 6, "GE Aeroderivative Gas Turbines—Design and Operating Features", M. W. Horner, Aug. 1996.

"39$^{th}$ GE Turbine State–of–the–Art Technology Seminar", Tab 7, "Advance Gas Turbine Materials and Coatings", P. W. Schilke, Aug. 1996.

(List continued on next page.)

Primary Examiner—Edward K. Look
Assistant Examiner—Ninh Nguyen
(74) Attorney, Agent, or Firm—Nixon & Vanderhye P.C.

(57) ABSTRACT

In a turbine bucket having an airfoil portion and a root portion, with a substantially planar platform at an interface between the airfoil portion and root portion, a platform cooling arrangement including at least one bore in the root portion and at least one impingement cooling tube seated in the bore, the tube extending beyond the bore with an outlet in close proximity to a targeted area on an underside of the platform.

16 Claims, 2 Drawing Sheets

OTHER PUBLICATIONS

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG ™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants," Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunitues for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assesment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivary et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report No. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.
"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier"paper, 4 pages.
"GE Businesses Share Technologies and Experts to Develop State–of–the–Art Products", Press Information, Press Release 95–NR10, May 16, 1995, GE Technology Transfer/ pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun 15, (1995).
"New Steam Cooling System is a Key to 60% Efficiency For GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the 21$^{st}$ Century—Gas Turbine Combined Cycles", Thomas C. Paul et al., Report.
"Power–Gen 'Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D. W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct., 1995.
"Proceedings of the Advanced Turbine Systems Annual Program Review Meeting", vol. I, "Overview of Westinghouse's Advanced Turbine Systems Program", Bannister et al., pp. 22–30, Oct., 1995.
"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct., 1995.
"Proceedings of the Advanced Turbine Systems Annual Program Review Meeting", vol. I, "General Electric ATS Program Technical Review Phase 2 Activities", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/ AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct. 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct., 1995.
"Proceedings of the Advanced Turbine Systems Annual Program Review Meeting", vol. I, "Materials/Manufacturing Element of the Advanced Turbine Systems Program", Karnitz et al., pp. 152–160, Oct., 1995.
"Proceedings of the Advanced Turbine Systems Annual Program Review Meeting", vol. I, "Land–Based Turbine Casting Initiative", Mueller et al., pp. 161–170, Oct., 1995.
"Proceedings of the Advanced Turbine Systems Annual Program Review Meeting", vol. I, "Turbine Airfoil Manufacturing Technology", Kortovich, pp. 171–181, Oct., 1995.
"Proceedings of the Advanced Turbine Systems Annual Program Review Meeting", vol. I, "Pratt & Whitney Thermal Barrier Coatings", Bornstein et al., pp. 182–193, Oct., 1995.
"Proceedings of the Advanced Turbine Systems Annual Program Review Meeting", vol. I, "Westinhouse Thermal Barrier Coatings", Goedjen et al., pp. 194–199, Oct., 1995.
"Proceedings of the Advanced Turbine Systems Annual Program Review Meeting", vol. I, "High Performance Steam Development", Duffy et al., pp. 200–220, Oct., 1995.
"Proceedings of the Advanced Turbine Systems Annual Program Review Meeting", vol. II, "Lean Premixed Combustion Stabilized by Radiation Feedback and heterogenous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject ot Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emmisions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step in H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos. DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos. DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1—Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1—Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995—Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine System (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quartely Report, Jan. 1–Mar. 31, 1997, Doc. #666275, Report No.: DOE/MC/31176–07.

"Proceedings of the 1997 Advanced Turbine Systems", Annual Program Review Meeting, Oct. 28–29, 1997.

* cited by examiner

GAS TURBINE BUCKET WITH IMPINGEMENT COOLED PLATFORM

This application is a continuation of Ser. No. 09/404,589 filed Sep. 24, 1999.

This invention was made with Government support under Contract No. DE-FC21-95MC31176 awarded by the Department of Energy. The Government has certain rights in this invention.

BACKGROUND OF THE INVENTION

This invention relates to the cooling of turbine buckets and, specifically, to the cooling of the platform region of the bucket, at the base of the airfoil.

BRIEF SUMMARY OF THE INVENTION

Stage one and stage two buckets in gas turbines experience high temperatures and stress, creating low cycle fatigue life concerns, particularly at the leading edge fillet where the airfoil joins the platform at the forward portion of the pressure side of the airfoil.

In aircraft engines, the bucket platforms are cooled by air entering the cavity below the platform, but this arrangement is not completely satisfactory, particularly in connection with the leading edge fillet.

This invention provides a unique solution to the above problem by directing cooling air through a tube, the forward end of which is located closely adjacent the underside of the platform, below the forward portion of the pressure side of the airfoil, so as to effectively impingement cool the platform in the localized region below the leading edge fillet.

In addition, film cooling holes are formed in the platform itself so that air introduced into the cavity by the impingement cooling tube can escape the cavity and flow along the upper surface of the platform along the contour of the pressure side of the airfoil, in a direction toward the trailing edge of the airfoil.

In its broader aspects, the invention relates to a turbine bucket having an airfoil portion and a root portion, with a substantially planar platform at an interface between the airfoil portion and root portion, a platform cooling arrangement comprising at least one bore in the root portion and at least one impingement cooling tube seated in the bore, the tube extending beyond the bore with an outlet in close proximity to a targeted area on an underside of the platform.

In another aspect, the invention relates to a method of cooling a leading edge fillet region of a turbine bucket having an airfoil portion and a root portion, the airfoil portion joined to a platform extending over the root portion, comprising: a) providing a through bore in a leading side of a cover plate in the root portion, the bore communicating with a recess in the root portion underlying the airfoil portion; b) inserting a tube in the bore, with a tip of the tube extending beyond the bore and in close proximity to a targeted area on an underside of the platform; c) supplying cooling air to the recess via the tube such that the targeted area is impingement cooled by the cooling air passing through the tube.

DETAILED DESCRIPTION OF THE INVENTION

Figure 1:
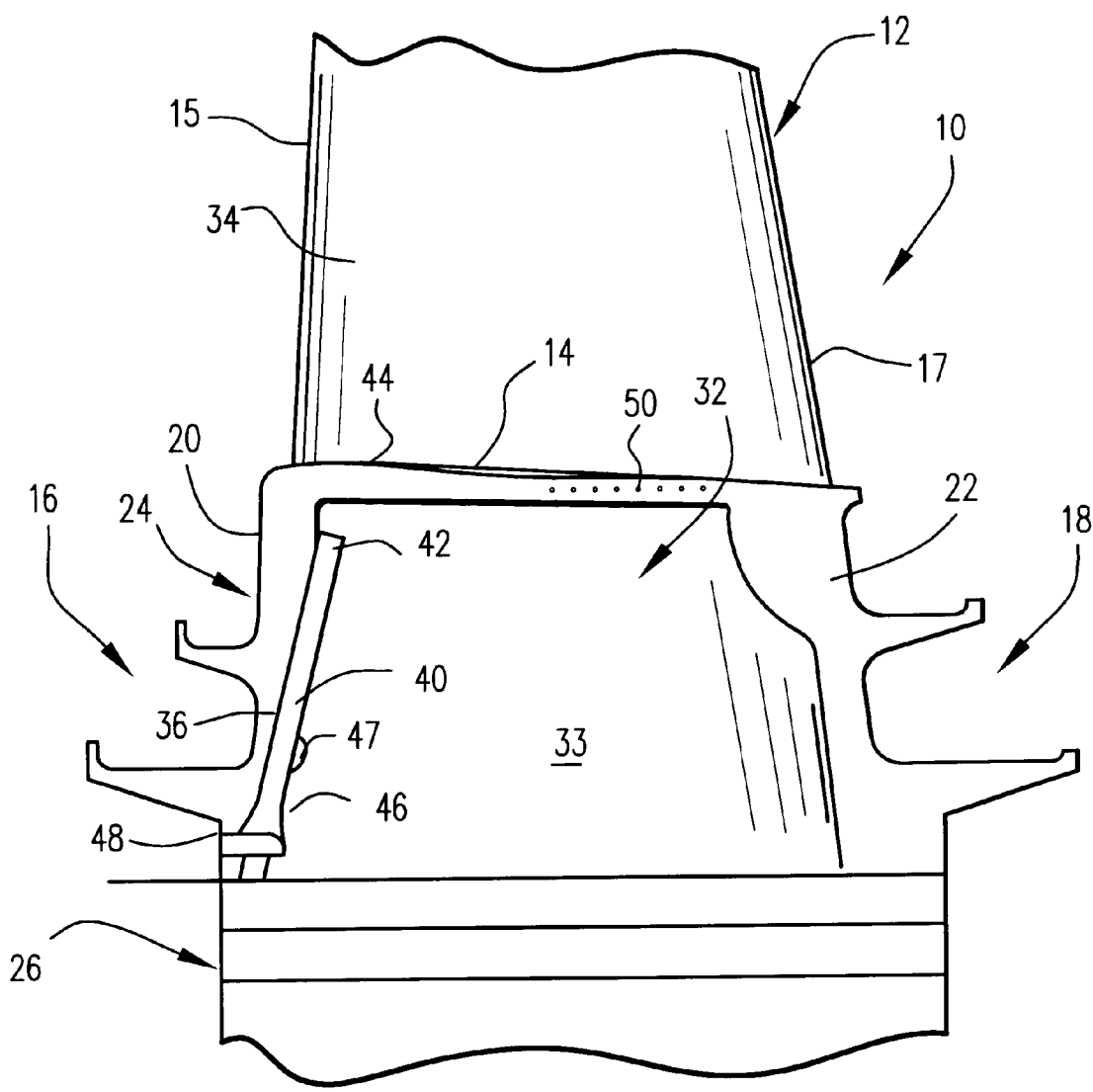
FIG. 1 is a partial side cross section of a bucket in accordance with the invention.
Figure 2:
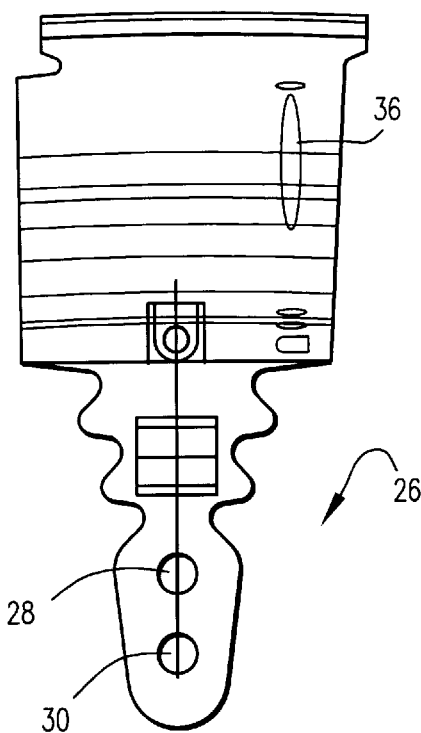
FIG. 2 is a partial end view of a lower dovetail portion (of the leading side edge) of the bucket not entirely shown in FIG. 1.
Figure 3:
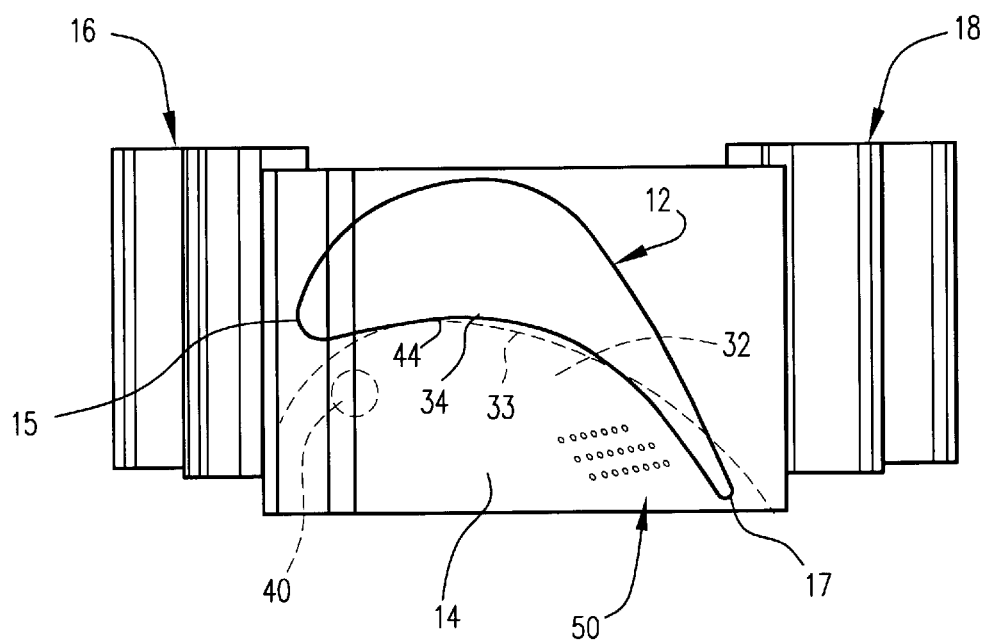
FIG. 3 is a top plan view of the bucket in accordance with the invention.

With reference to FIGS. 1–3, a turbine bucket 10 includes an airfoil portion 12 extending vertically upwardly from a horizontal, substantially planar platform 14. The airfoil portion has a leading edge 15 and a trailing edge 17. Below the platform 14, there are two pair of so-called "angel wings" 16, 18 extending in opposite directions from the leading and trailing sides 20, 22 of the cover plate 24 in the root portion of the bucket. The platform 14 is joined with the cover plate 24. Below the root portion, there is a dovetail 26 by which the bucket is secured to a turbine wheel (in a preferred embodiment, the stage 1 or stage 2 wheels of a gas turbine).

Cooling passages (not shown) extend in radially outward and inward directions in a serpentine path through the airfoil portion, the path having passages in the root portion communicating with supply and return passages 28, 30 in the dovetail. The internal airfoil cooling circuit forms no part of the invention, however, and is therefore not shown in detail. Of significance here is the substantially hollow space or recess 32 in the root portion, above the dovetail 26 but below the platform 14, defined further by the sides 20, 22 of the cover plate. This recess is generally on the pressure side 34 of the airfoil, and it will be appreciated from FIG. 3 that a relatively large portion of the platform 14 on the pressure side 34 of the airfoil overlies the hollow space or recess 32.

An angled hole 36 is drilled through the leading side 20 of the cover plate 24 from the lower end of the root portion, on the external side thereof, extending upwardly (i.e., substantially radially) and opening into the recess 32. Due to the angled orientation, the hole 36 has an exit profile on the interior of the root wall 38 which is elliptical in shape as shown in FIG. 2. An impingement cooling tube 40 is pressed into the hole 36 from under the root portion, so that an outlet at the upper end or tip 42 of the tube is located close to the underside of the platform, and close to a targeted area along the leading edge fillet 44 where the airfoil joins the platform.

The lower end of the tube 40 is flared at 46 to limit the extent of insertion, and the tube may be fixed in place by a spot weld at 47 to prevent the tube from sliding back through the hole in a direction opposite the assembly direction. Preferably, the tube end 42 is within about 0.5" from the underside of the platform.

Since the lower edge of the cover plate 24 will seat on the wheel surface, thus blocking the hole 36, a second hole 48 is drilled from the leading side 20 of the cover plate 24 so as to intersect with the hole 36, just below the lower end of the tube 40. In this way, rotor or wheel space purge air can enter the tube 40 via hole 36.

In addition, an array of film cooling holes 50 extend through the platform 14 from the recess 32 to a location on the external side of the platform.

With the above arrangement, purge air from wheel space below the bucket will enter the hole 48 and flow through the tube 40 so as to impinge directly on the underside of the platform 14, below but proximate the leading edge fillet 44. The underside of the platform 14 is thus impingement cooled in the leading edge fillet area to reduce stress and improve low cycle fatigue margins. Of course, the enhancement of heat transfer in this specific region continues along the platform and at least partially under the airfoil itself.

Another feature of the invention lies in the combination of the above described impingement cooling with film cooling along the upper surface of the platform: This is achieved by utilizing the array of film cooling holes 50 in the platform, allowing the cooling air in the hollow space 32 to exit along the top surface of the platform. The film cooling holes 50 are directionally oriented so that the cooling air merges with the gas path air and flows along the pressure side of the airfoil toward the trailing edge 17. The flowpath of the film cooling air is such that it can carry over to the suction side of the platform of the adjacent bucket, increasing the overall effectiveness of the system.

To further enhance heat transfer, the underside of the platform 14 can be provided with any suitable rough coat, thus increasing the surface area available for heat transfer. In addition, one or more additional impingement cooling tubes may be used in conjunction with the tube 40 to enhance heat transfer at targeted locations along the underside of the platform.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine bucket having an airfoil portion and a root portion, with a substantially planar platform at an interface between the airfoil portion and root portion, a platform cooling arrangement comprising:

at least one bore in said root portion and at least one impingement cooling tube seated in said at least one bore, said tube extending beyond said bore with an outlet in close proximity to a targeted area on an underside of said platform.

2. The bucket of claim 1 wherein said targeted area lies within a recess under said platform, and proximate a leading edge fillet of said airfoil portion.

3. The bucket of claim 2 wherein said platform is provided with a plurality of film cooling holes communicating with said recess.

4. The bucket of claim 3 wherein said plurality of film cooling holes are located closer to a trailing edge of said airfoil portion than to the leading edge of said airfoil portion.

5. The bucket of claim 4 wherein said impingement cooling tube and said plurality of film cooling holes are located on a pressure side of said airfoil portion.

6. The bucket of claim 3 wherein said film cooling holes are directionally oriented to cause cooling air to flow in a path generally toward said trailing edge of said airfoil portion.

7. The bucket of claim 1 wherein the underside of said platform is coated with a rough coat material.

8. The bucket of claim 1 wherein said impingement cooling tube is flared at its rearward end to limit forward insertion into said bore.

9. The bucket of claim 1 wherein said impingement cooling tube is secured within said bore so as to prevent movement in a direction away from said platform.

10. In a turbine bucket having an airfoil portion and a root portion, with a substantially planar platform at an interface between the airfoil portion and root portion, a platform cooling arrangement comprising:

means for impingement cooling a targeted area on an underside of said platform.

11. A method of cooling a leading edge fillet region of a turbine bucket having an airfoil portion and a root portion, said airfoil portion joined to a platform extending over said root portion, comprising:

a) providing a through bore in a leading side of a cover plate in said root portion, said bore communicating with a recess in said root portion underlying said airfoil portion;

b) inserting a tube in said bore, with a tip of the tube extending beyond said bore and in close proximity to a targeted area on an underside of said platform;

c) supplying cooling air to said recess via said tube such that said targeted area is impingement cooled by said cooling air passing through said tube.

12. The method of claim 11 wherein said targeted area is an area in said recess substantially directly beneath the leading edge fillet of said airfoil portion.

13. The method of claim 11 including providing film cooling holes to allow said cooling air to escape from said recess.

14. The method of claim 11 wherein said film cooling holes are located in said platform.

15. The method of claim 14 wherein said impingement cooling tube and said film cooling holes are on a pressure side of said airfoil portion.

16. The method of claim 15 wherein said film cooling holes are directionally oriented to cause cooling air to flow in a path generally toward said trailing edge of said airfoil portion.

* * * * *